United States Patent [19]

Neefe

[11] Patent Number: 4,657,363
[45] Date of Patent: * Apr. 14, 1987

[54] FLUORESCENT CORNEAL COLOR CHANGE DEVICE

[76] Inventor: Charles W. Neefe, 811 Scurry St., P.O. Box 429, Big Spring, Tex. 79720

[*] Notice: The portion of the term of this patent subsequent to Oct. 7, 2003 has been disclaimed.

[21] Appl. No.: 769,258

[22] Filed: Aug. 26, 1985

[51] Int. Cl.$^4$ .......................... G02C 7/04; G02C 7/10; D06P 5/00
[52] U.S. Cl. ......................................... 351/162; 8/507
[58] Field of Search .............. 350/160 R, 160 H, 161, 350/162; 8/507

[56] References Cited

U.S. PATENT DOCUMENTS 3,189,914  6/1965  Gusewitch et al. ............ 351/162 X
3,679,504  7/1972  Wichterle ...................... 351/162 X Primary Examiner—John K. Corbin
Assistant Examiner—Scott J. Sugarman

[57] ABSTRACT

A daylight fluorescent cosmetic device for changing the apparent color of the eye. Fluorescent and nonfluorescent pigments are added to the monomer before being polymerized to form the hydrophilic device material. Daylight illumination activates the fluorescent pigments which radiate light of the desired color. The colored fluorescent light radiated from the cosmetic device changes the apparent color of the eye.

12 Claims, 4 Drawing Figures

FLUORESCENT CORNEAL COLOR CHANGE DEVICE

The desire to change and enhance the apparent color of the eye was recorded by the Egyptians five thousand years ago. Cosmetic eye makeup for the eye area accounts for the larger percentage of the cosmetic sales.

PRIOR ART

Several contact lenses have been produced in an effort to achieve cosmetic eye color change.

One attempt employed a laminated structure with a painted opaque plastic member. The result was a thick heavy lens which was difficult to fabricate and difficult to wear. A later attempt employed a colored opaque porous member surrounding a clear cylinder from which the lens was cut by lathing. This resulted in a lens having a pupil and iris pattern and the porous member had tendencies to flake and chip at the edge. (U.S. Pat. No. 3,454,332—Siegel). A third generation of colored lenses provided a thin layer of colored opaque markings placed in a clear material. The opaque colored markings radiated from the center of the clear material in a geometric pattern.

STATE OF THE ART

The manufacture of plano or zero power contact lenses is most difficult and expensive. A solution has been found by an ocular device with central visual aperture. The visual aperture being from 4.0 milimeters to 7.0 milimeters in diameter surrounded by a circular hydrogel material. The edges of the central aperture are tapered on the convex surface thereby thinning the device around the aperture. This thinning of the aperture edge is necessary to prevent the tear miniscus formed by surface tension at the aperture edge. The edge thinning also provides a comfortable device and minimum of foreign body sensation as the eyelid travels over the aperture during the blink.

The opening at the center to the atmosphere prevents hypoxia and the formation of corneal edema. The non-refraction open aperture device can be tolerated for extended periods of time without the edema problems encountered with refractive lenses. The materials used are stronger and more durable since no consideration of oxygen permeability is required. The aperture device may be tinted by dying or by adding colorant to the liquid monomer before polymerization. The aperture non-refractive device is made from any of the available soft lens materials. Materials which are translucent are useful as the central visual area is an open aperture. The material surrounding the central hole must provide comfort and the color required to change the apparent color of the eye.

EXAMPLES OF THE COLORANTS

FD and C Green #6, Leeben Color Blue LA-589, Brown LS-595, Green 16128 and Violet LS-611.

The acid dyes, known as azo dyes, containing nitrogen to nitrogen bonds —N=N— may be used to practice the invention as may the dyes known as reactive dyes and the sulphur dyes. The sulphur dyes are fixed or made fast by removing the sodium sulphide which made the dye soluble. Reactive dyes require no special fixing step, only extraction on unreacted dye, as they react chemically with the material and are thus made permanent. The properties of dyes are well known to the art.

The addition of daylight fluorescent pigments to cosmetic devices for the eye add a new and striking appearance to the eye.

Daylight fluorescent pigments are transparent organic resin particles containing dyes which are capable of fluorescing while in a solid state solution.

Certain substances, especially a number of organic dyes, have the property of fluorescing under visible light at the blue end of the spectrum. The fluorescence of these organic dyes is associated with the individual dye molecules; in order for them to fluoresce efficiently, they must be dissolved in fairly low concentrations in a solvent for the dyes. Due to the nature of the dyes used, it is necessary to have an organic medium or carrier to put them into solution; and in order to have a pigment, it is necessary that this medium be a solid. The type of material which meets these requirements for a carrier matrix for the dyes is an organic resin.

The physical structure of the pigments is amorphous, or non-crystalline. In contrast to most other pigments, they are not formed by precipitation and do not consist of particle agglomerates, but rather of individual non-porous particles of various sizes. This and the fact that they are powdered organic resins makes their dispersion in most media relatively easy.

The particle size range of these daylight fluorescent pigments is narrowed by air classification after pulverizing. This results in a product which is practically 100 percent sub-sieve, or finer than 325 mesh (44 microns).

Daylight fluorescent pigments are stable to indoor light or conditions of outdoor light other than direct sunlight.

It is possible to mix more than one fluorescent pigment or colorant in the same formula, to obtain intermediate hues.

The A, AX, T and 6T series of daylight fluorescent pigments supplied by Dayglo Corp. of Cleveland, Ohio present no eye toxicity when added to the liquid monomer and polymerized in the cosmetic device. Representive samples of the products produced no significant eye irritation when applied directly in the eye.

The ability to fluoresce and radiate light of a specific color under daylight conditions provides an enhancement of the eye color not previously known or possible.

EXAMPLES OF THE MONOMER MIXTURE (1)
Ethylene glycol monomethacrylate: 64.8%
Diethylene glycol monomethacrylate: 7.056%
Ethylene glycol dimethacrylate: 0.144%
Water: 20.9%
Ammonium persulfate: 1.1%
2-dimethylaminoethyl acetate: 6.0%

(2)
Ethylene glycol monomethacrylate: 54.7%
Diethylene glycol monomethacrylate: 17.2%
Diethylene glycol dimethacrylate: 0.6%
Ammonium persulfate: 1.1%
Dimethylaminoethyl acetate: 5.8%

Low water content hydrophilic materials having a water content 25 to 40 percent water by weight have provided consistently fine results. Low water devices are strong, durable and they resist tearing. The addition of methacrylic acid to the above formulas increases the water content of the hydrogel.

IN THE DRAWINGS

Soft refractive contact lenses are fitted having a concave radius longer than the convex radius of the cornea. The corrective soft contact lenses are also fitted with a diameter larger than the cornea. If these parameters are used for the aperture device, the device will not center around the pupil. The soft aperture fluorescent color change device is made having a diameter smaller than the cornea. In fitting the aperture device a diameter of from 10.0 milimeters to 12 milimeters has been found useful with a concave radius shorter than the cornea.

THE DEVICE FUNCTIONS AS FOLLOWS

Figure 1:
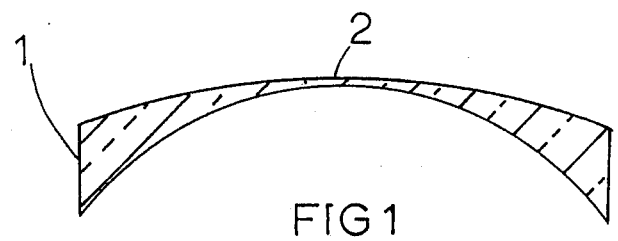
FIG. 1 shows a negative refractive cosmetic lens in section.

Cosmetic contact lenses having a negative refractive power have a longer convex radius 2 FIG. 1 and a thick edge 1 FIG. 1.

Figure 2:
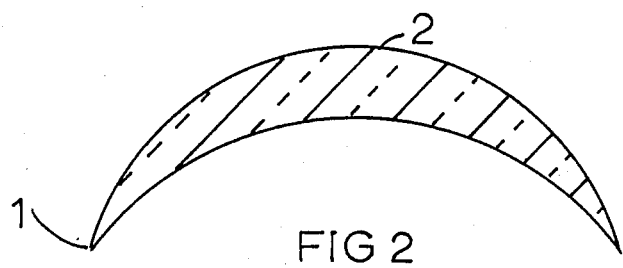
FIG. 2 shows a positive refractive cosmetic lens in section.
Figure 3:
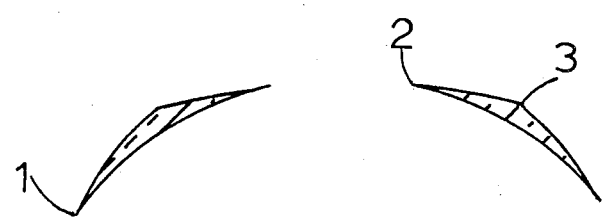
FIG. 3 shows a non-optical color change device in section.
Figure 4:
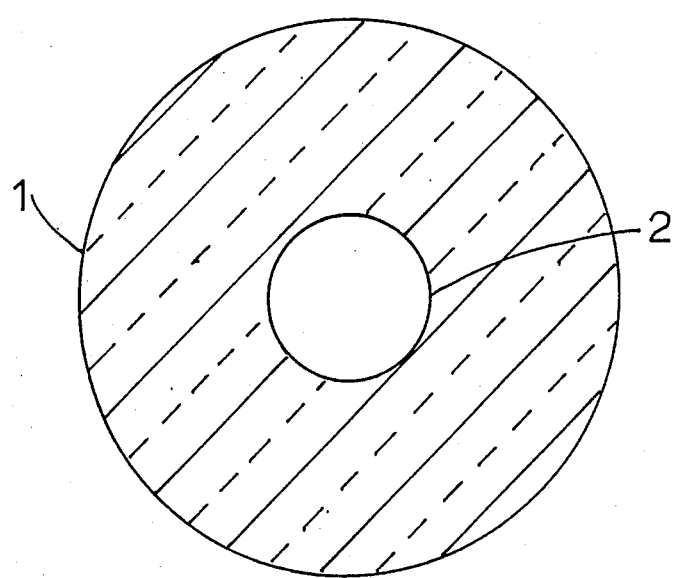
FIG. 4 shows a non-optical color change device from the front.

Positive refractive power fluorescent cosmetic contact lenses have a shorter convex radius 2 FIG. 2 and a thin edge 1 FIG. 2. The fluorescent aperture cosmetic device has a thin edge 1 FIG. 3 and a thin central edge 2 FIG. 3. The midpoint 3 FIG. 3 is thick for stability. The cosmetic device contains a fluorescent pigment which emits colored light in presence of daylight illumination. This fluorescence imparts an apparent color change to the eye.

Maximum fluorescent brightness is not the primary objective, non-fluorescent toning pigments are utilized to obtain strikingly different color effects.

Best results are usually obtained by mixing adjacent colors in the spectrum. The daylight activated fluorescent pigments are most impressive when used with a hydrophilic material.

Effective color mixtures are made by the use of 0.04% by weight of monomer Day Glo pigment A-19 Horizon Blue combined with 0.01% by weight Sunfast Violet 228-1158.

The use of 0.04% by weight of the monomer Signal Green Day Glo A-18 combined with 0.01% by weight Sunfast Blue 249-3450.

Day Glo colors are made by the Day Glo Corp., Cleveland, Ohio.

Sunfast colors are made by Sun Chemical Corp., Cincinnati, Ohio.

The use of daylight fluorescent pigments with conventional prescription contact lenses as in FIG. 1 or 2 will produce a fluorescent glow which covers the entire lens area and provides an apparent eye color change. The open aperture cosmetic device, produces no refractive visual changes. The ability of the cosmetic device to radiate light of a specific color when illuminated by daylight white light provides a visibility apparent eye color change.

It is understood that the invention is not limited to the exact details of construction shown and described herein for obvious modifications will occur to persons skilled in the art.

I claim:

1. A fluorescent cosmetic device for changing the apparent color of the eye substantially the size and shape of the cornea and a daylight fluorescent pigment dispersed within the device is composed of a fluorescent dye in a transparent organic amorphous resin particle capable of fluorescing light of a specific color under visible light, the fluorescent color being visible under daylight conditions changes the apparent color of the eye.

2. A fluorescent cosmetic device for changing the apparent color of the eye substantially the size and shape of the cornea and a daylight fluorescent pigment dispersed within the device composed of a fluorescent dye in solid state solution in a transparent organic amorphous resin particle capable of fluorescing and radiating light of a specific color in the solid state under visible light at the blue end of the spectrum, the fluorescent color being visible under daylight conditions changes the apparent color of the eye.

3. The subject matter set forth in claim 2 wherein two or more colorants are added to the device material.

4. The subject matter set forth in claim 2 wherein the device has a negative refractive power.

5. The subject matter set forth in claim 2 wherein the device has a positive refractive power.

6. The subject matter set forth in claim 2 wherein the device has no refractive power.

7. A fluorescent cosmetic device for changing the apparent color of the eye substantially the size and shape of the cornea and dispersed within the device a daylight fluorescent pigment composed of a fluorescent dye in solid state solution in a transparent organic amorphous resin particle of a size less than 44 microns and capable of fluorescing and radiating light of a specific color in the solid state under visible light at the blue end of the spectrum, the fluorescent color visible under daylight conditions imparts an apparent color change to the eye.

8. The subject matter set forth in claim 7 wherein the fluorescent pigment is added to the liquid monomer before the liquid monomer is polymerized to form the device.

9. The subject matter set forth in claim 7 wherein two or more colorants are added to the device material.

10. The subject matter set forth in claim 7 wherein the device has a negative refractive power.

11. The subject matter set forth in claim 7 wherein the device has a positive refractive power.

12. The subject matter set forth in claim 7 wherein the device has no refractive power.

* * * * *